United States Patent
Kuo

(10) Patent No.: US 10,677,908 B2
(45) Date of Patent: Jun. 9, 2020

(54) MOBILE NAVIGATION METHOD AND SYSTEM

(71) Applicant: Alpha Networks Inc., Hsinchu (TW)

(72) Inventor: Rong-Fa Kuo, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 281 days.

(21) Appl. No.: 15/591,487

(22) Filed: May 10, 2017

(65) Prior Publication Data

US 2018/0031692 A1 Feb. 1, 2018

(30) Foreign Application Priority Data

Aug. 1, 2016 (TW) .............................. 105124361 A

(51) Int. Cl.
*G01S 13/60* (2006.01)
*G01S 13/87* (2006.01)
*G01S 13/931* (2020.01)

(52) U.S. Cl.
CPC ............ *G01S 13/60* (2013.01); *G01S 13/876* (2013.01); *G01S 13/931* (2013.01)

(58) Field of Classification Search
CPC ................................ G01S 13/60; G01S 13/876
See application file for complete search history.

(56) References Cited

U.S. PATENT DOCUMENTS

| | | | |
|---|---|---|---|
| 5,274,380 A | 12/1993 | Yatsuka et al. | |
| 5,387,916 A | 2/1995 | Cohn | |
| 7,250,901 B2 | 7/2007 | Stephens | |
| 7,739,034 B2* | 6/2010 | Farwell | G05D 1/0244 701/445 |
| 2005/0088335 A1* | 4/2005 | Stephens | G01S 7/026 342/146 |

(Continued)

FOREIGN PATENT DOCUMENTS

| DE | 102012104746 | 12/2013 |
|---|---|---|
| GB | 2463703 | 3/2010 |

(Continued)

OTHER PUBLICATIONS

Japan Patent Office, "Office action", dated May 29, 2018.
European Patent Office, "European search report", dated Jan. 2, 2018.

*Primary Examiner* — Marcus E Windrich
(74) *Attorney, Agent, or Firm* — WPAT, PC

(57) ABSTRACT

A mobile navigation system includes: a radar antenna carried by the vehicle, and emitting first and second sensing beams at first and second time points, respectively; first and second retro-directive antennas or beam-reflecting objects disposed at first and second positions, respectively, and being a specific distance from each other; and a processing device electrically coupled to the radar antenna. The first and second retro-directive antennas or beam-reflecting objects respectively return first and second retro waves corresponding to a direction of the first sensing beam, and respectively return third and fourth retro waves corresponding to a direction of the second sensing beam. The processing device receives the first, second, third and fourth retro waves, and determines a moving direction of the vehicle according to the first, second, third and fourth retro waves and the specific distance.

9 Claims, 8 Drawing Sheets

(56) References Cited

U.S. PATENT DOCUMENTS

| | | | |
|---|---|---|---|
| 2005/0270228 A1* | 12/2005 | Stephens | G01S 7/025 342/146 |
| 2008/0303718 A1 | 12/2008 | Chiang et al. | |
| 2009/0121918 A1 | 5/2009 | Shirai et al. | |
| 2010/0066503 A1 | 3/2010 | Rhie et al. | |
| 2011/0285593 A1* | 11/2011 | Cavirani | G01S 7/024 342/457 |
| 2012/0289338 A1 | 11/2012 | Chen et al. | |
| 2013/0162460 A1 | 6/2013 | Aryanfar et al. | |
| 2014/0028490 A1* | 1/2014 | Huang | G01S 13/58 342/107 |
| 2014/0060949 A1* | 3/2014 | Anderson | G01S 13/865 180/167 |
| 2014/0097988 A1* | 4/2014 | Beauregard | G01S 5/0252 342/461 |
| 2014/0134963 A1 | 5/2014 | Aryanfar | |
| 2014/0176365 A1 | 6/2014 | Aryanfar et al. | |
| 2014/0266894 A1 | 9/2014 | Rasheed et al. | |
| 2014/0340253 A1 | 11/2014 | Koerber et al. | |
| 2015/0303581 A1* | 10/2015 | Bodo | G01S 13/876 342/7 |
| 2016/0084943 A1* | 3/2016 | Arage | G01S 7/41 342/102 |
| 2016/0238691 A1 | 8/2016 | Kuo et al. | |

FOREIGN PATENT DOCUMENTS

| | | |
|---|---|---|
| JP | 1994258425 | 9/1994 |
| JP | 1997183320 | 7/1997 |
| JP | 1999353579 | 12/1999 |
| JP | 2007524839 | 8/2007 |
| JP | 2009046039 | 3/2009 |
| TW | 200625721 | 7/2006 |
| TW | 201126189 | 8/2011 |

* cited by examiner

MOBILE NAVIGATION METHOD AND SYSTEM

FIELD OF THE INVENTION

The present invention relates to navigation means, and more particularly to mobile navigation method and system.

BACKGROUND OF THE INVENTION

Generally, an electronic radar positioning process is conducted by emitting an electromagnetic wave from an emitter and calculating relative distance and speed of a target object according information of a reflected electromagnetic wave, which is reflected from the target object back to the emitter. In practice, not only the target object but also other objects might reflect the electromagnetic wave. When the electromagnetically positioning process is performed in such an environment, detection errors are likely to occur since more than one reflected electromagnetic wave might be received. For example, if the radar positioning is implemented with a frequency-modulated continuous wave (FMCW), the scattering behavior of objects might happen to form multi-directional reflected waves, and different reflective paths would result in a multi-path electromagnetic wave. In the FMCW radar positioning method, electromagnetic waves in different paths would show different distances, so the multi-path electromagnetic wave would make the detection of the position of the target object unreliable.

SUMMARY OF THE INVENTION

Therefore, the present invention provides mobile navigation system and method for electromagnetically positioning a target zone and precisely guiding a vehicle toward the target zone.

In an aspect of the present invention, a mobile navigation system for guiding a vehicle, comprises: a radar antenna carried by the vehicle, emitting a first sensing beam at a first time point and emitting a second sensing beam at a second time point; a first retro-directive antenna disposed at a first position; a second retro-directive antenna disposed at a second position, which is a specific distance from the first position; and a processing device electrically coupled to the radar antenna. The first retro-directive antenna and the second retro-directive antenna respectively return a first retro wave and a second retro wave corresponding to a direction of the first sensing beam. The first retro-directive antenna and the second retro-directive antenna respectively return a third retro wave and a fourth retro wave corresponding to a direction of the second sensing beam. The processing device receives the first, second, third and fourth retro waves, and determines a moving direction of the vehicle according to the first, second, third and fourth retro waves and the specific distance.

In another aspect of the present invention, a mobile navigation method is adapted for guiding a moving vehicle toward a target point, wherein the moving vehicle carries an omnidirectional antenna, and a first retro-directive antenna and a second retro-directive antenna are arranged at opposite sides of the target point and have a specific distance from each other. The mobile navigation method comprises: emitting a first sensing beam from the moving vehicle at a first time point; calculating a first distance that a first retro wave travels and a second distance that a second retro wave travels, wherein the first retro wave and the second retro wave are transmitted back corresponding to the first sensing beam; emitting a second sensing beam from the moving vehicle at a second time point, which is a period of time after the first time point; calculating a third distance that a third retro wave travels and a fourth distance that a fourth retro wave travels, wherein the third retro wave and the fourth retro wave are transmitted back corresponding to the second sensing beam; and determining whether a current moving direction of the moving vehicle needs to be adjusted or not according to the first, second, third and/or fourth distances and the specific distance.

In a further aspect of the present invention, a mobile navigation method is adapted for guiding a moving vehicle toward a target point, wherein the moving vehicle carries a directive beamforming antenna, and a first retro-directive antenna and a second retro-directive antenna are each arranged at a specific distance from the target point. The mobile navigation method comprises: emitting a first sensing beam from the moving vehicle at a first time point; receiving a first retro wave in response to the first sensing beam, wherein the first retro wave is emitted or reflected by one of the first retro-directive antenna and the second retro-directive antenna; emitting a second sensing beam from the moving vehicle at a second time point; receiving a second retro wave in response to the second sensing beam, wherein the second retro wave is emitted or reflected by the other of the first retro-directive antenna and the second retro-directive antenna; realizing a first emission angle of the first sensing beam and calculating a first distance that the first retro wave travels; realizing a second emission angle of the second sensing beam and calculating a second distance that the second retro wave travels; and determine whether a current moving direction of the moving vehicle needs to be adjusted or not according to the first distance, the second distance, the first emission angle and the second emission angle.

In a still further aspect of the present invention, a mobile navigation system for guiding a vehicle, comprises: a radar antenna carried by the vehicle, emitting a first sensing beam at a first time point and emitting a second sensing beam at a second time point; a first specific reflecting object disposed at a first position; a second specific reflecting object disposed at a second position, which is a specific distance from the first position; and a processing device electrically coupled to the radar antenna. The first specific reflecting object and the second specific reflecting object respectively return a first retro wave and a second retro wave corresponding to a direction of the first sensing beam. The first specific reflecting object and the second specific reflecting object respectively return a third retro wave and a fourth retro wave corresponding to a direction of the second sensing beam. The processing device receives the first, second, third and fourth retro waves, and determines a moving direction of the vehicle according to the first, second, third and fourth retro waves and the specific distance.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
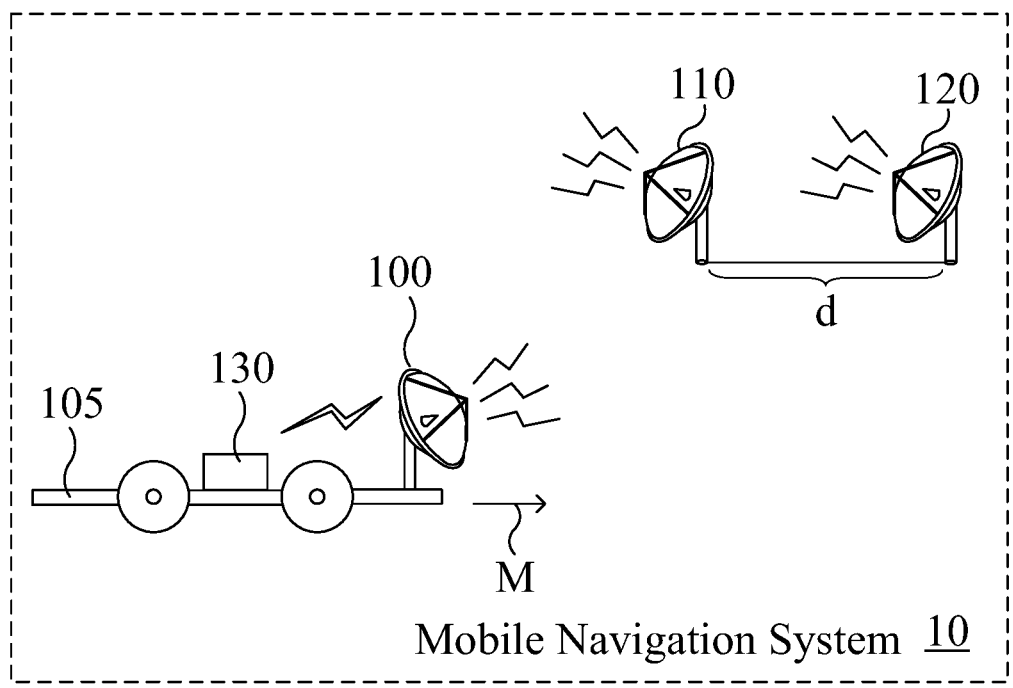
FIG. 1 is a schematic diagram illustrating a mobile navigation system according to an embodiment of the present invention.

Referring to FIG. 1, an embodiment of a mobile navigation system for guiding a vehicle according to the present invention is schematically illustrated. In this embodiment, the mobile navigation system 10 includes a radar antenna 100, a first retro-directive antenna 110, a second retro-directive antenna 120, and a processing device 130. The radar antenna 100 is carried by a vehicle 105 and sequentially emits sensing beams continuously or periodically at different time points. For example, the radar antenna 100 may be an omnidirectional antenna (OMNI antenna), or a beamforming antenna. The first retro-directive antenna 110 is disposed at a first position, and the second retro-directive antenna 120 is disposed at a second position. There is a specific distance d between the second position and the first position. The processing device 130 is electrically coupled to the radar antenna 100 for receiving data from the radar antenna 100. In an embodiment, the processing device 130 is disposed at and moves with the vehicle 105, and electrically coupled to the radar antenna 100 in either wireless or wiring manner. Alternatively, the processing device 130 may be disposed separately from the vehicle 105 provided that the vehicle 105 or the vehicle driver can communicate with the processing device 130 to guide the vehicle 105 along a desirable direction. For example, the processing device 130 may be disposed at a network node. The operating principle of the present invention will be described hereinafter, using the system, the flowchart, and the scheme as shown in FIGS. 1, 2, 3A and 3B as examples.

In an embodiment of mobile navigation system illustrated in FIG. 1, the radar antenna 100 emits a first sensing beam at a first time point, and then emits a second sensing beam in a second direction at a second time point. The first retro-directive antenna 110 is an antenna that transmits a signal back to where the first sensing beam is emitted, and similarly, the second retro-directive antenna 120 is an antenna that transmits a signal back to where the second sensing beam is emitted. The first retro-directive antenna 110 receives the first sensing beam, and returns a corresponding wave in response to the received first sensing beam. The returned corresponding wave is so called as a first retro wave. The second retro-directive antenna 120 also receives the first sensing beam, and returns a corresponding wave, which is so called as a second retro wave, in response to the received first sensing beam. Likewise, the first retro-directive antenna 110 receives the second sensing beam, and in response to the received second sensing beam, returns a corresponding wave, which is so called as a third retro wave. The second retro-directive antenna 120 also receives the second sensing beam, and in response to the received second sensing beam, returns a corresponding wave, which is so called as a fourth retro wave. The radar antenna 100 receives the first through fourth retro waves from the retro-directive antennas 110 and 120, and the processing device 130 receives the first through fourth retro waves from the radar antenna 100. According to the information of the first through fourth retro waves and the specific distance d between the positions of the first and second retro-directive antennas 110 and 120, the processing device 130 determines the direction where the vehicle 105 should be guided subsequently. For example, the vehicle 105 initially moves in a direction M, and the moving direction optionally changes in response to a control command issued by the processing device 130.

Figure 2:
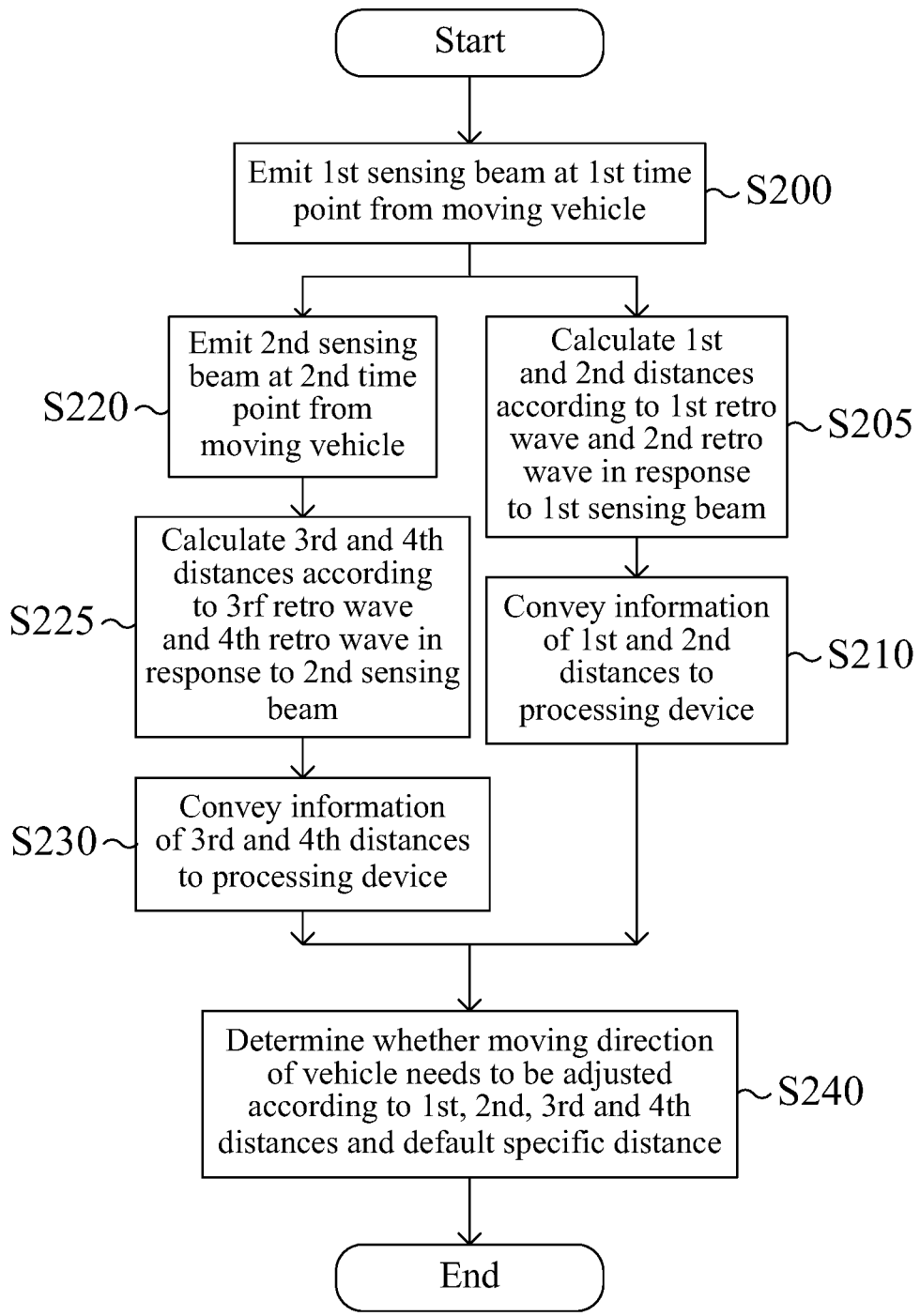
FIG. 2 is a schematic flowchart illustrating a mobile navigation method according to an embodiment of the present invention.

In an embodiment of mobile navigation method illustrated in FIG. 2, an OMNI antenna is used as an example of the radar antenna 100, and disposed on a vehicle to be guided. First of all, the radar antenna 100 emits a first sensing beam at a first time point (Step 200). After receiving the first sensing beam, the first retro-directive antenna 110 transmits a first retro wave back, and the second retro-directive antenna 120 transmits a second retro wave back. Meanwhile, a first distance that the first retro wave travels and a second distance that the second retro wave travels are calculated (Step S205). The first and second distance information is then conveyed to the processing device 130 (Step S210). After the first sensing beam is emitted in Step S200, the radar antenna 100 carried by and moving with the vehicle 105 in the direction M further emits a second sensing beam at a second time point (Step S220). After receiving the second sensing beam, the first retro-directive antenna 110 returns a third retro wave, and the second retro-directive antenna 120 returns a fourth retro wave. Meanwhile, a third distance that the third retro wave travels and a fourth distance that the fourth retro wave travels are calculated (Step S225). The third and fourth distance information is then conveyed to the processing device 130 (Step S230). Afterwards, in Step S240, the processing device 130 determines whether and how the moving direction should be adjusted based on the first, second, third and fourth distances, the default specific distance d between the positions of the first retro-directive antenna 110 and the second retro-directive antenna 120, and a shift of the vehicle 105 in the direction M within a time period from the first time point to the second time point.

Figure 3A:
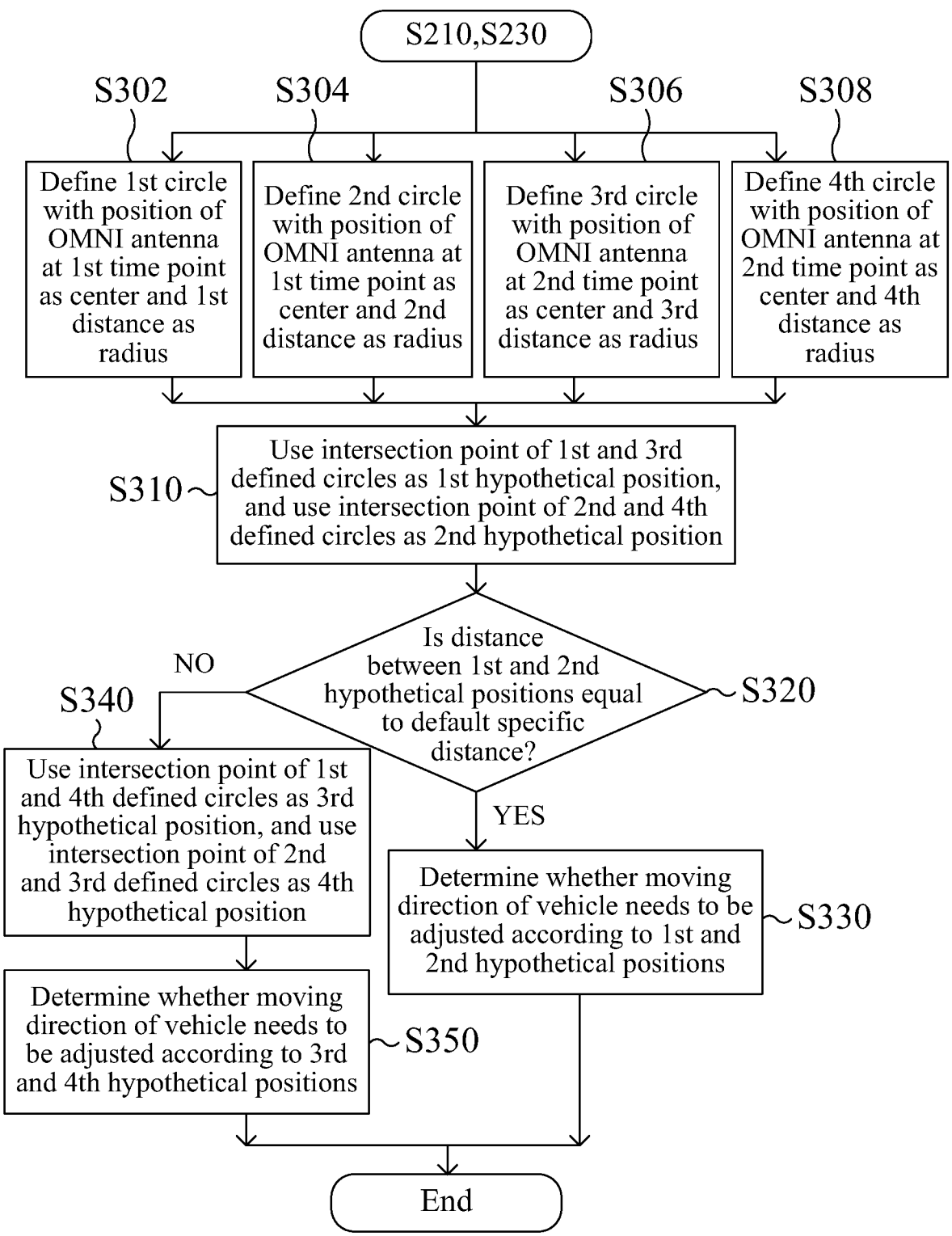
FIG. 3A is a schematic flowchart exemplifying details of the mobile navigation method as illustrated in FIG. 2, particularly regarding Step S240.
Figure 3B:
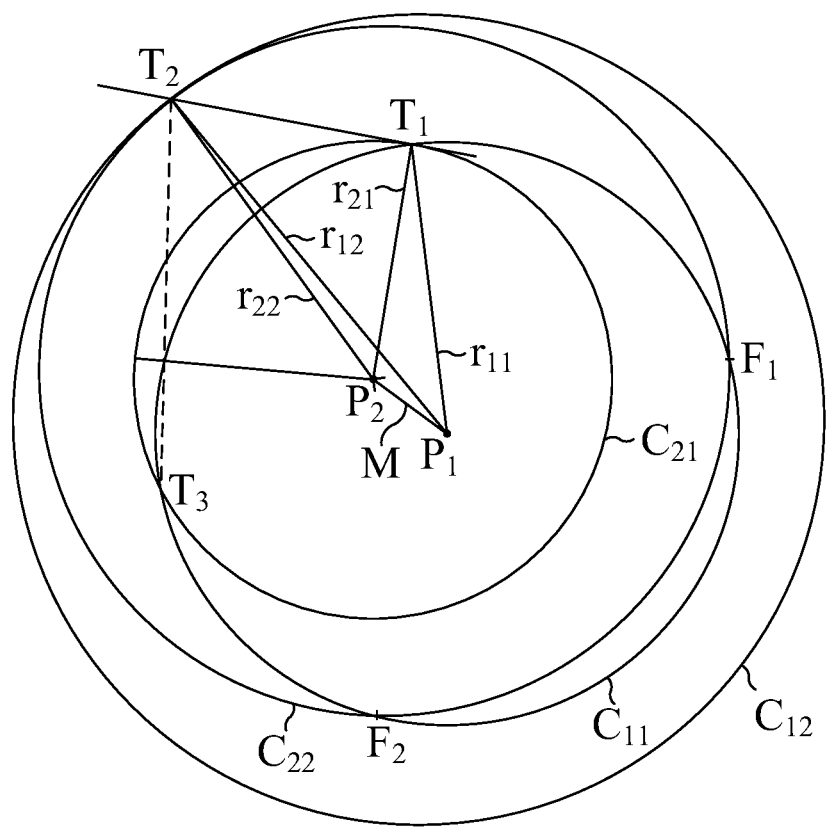
FIG. 3B is a scheme illustrating a relationship among the first through fourth distances and the specific distance d.

Further referring to FIG. 3A and FIG. 3B, more exemplified details are given for facilitating understanding of the invention. The flowchart illustrated in FIG. 3A shows the details of Step S240, and the scheme illustrated in FIG. 3B shows the relationship among the first, second, third and fourth distances, and the specific distance d between the positions of the first retro-directive antenna 110 and the second retro-directive antenna 120. After Step S210 and S230, the processing device receives information associated with the first, second, third and fourth distances. Then in Step S302, the processing device 130 configures a circle, hereinafter a first defined circle, with the position where the radar antenna 100 is at the first time point treated as a center and the first distance treated as a radius. Then in Step S304, the processing device 130 configures another circle, hereinafter a second defined circle, with the position where the radar antenna 100 is at the first time point treated as a center and the second distance treated as a radius. Likewise, in Step S306, the processing device 130 configures another circle, hereinafter a third defined circle, with the position where the radar antenna 100 is at the second time point treated as a center and the third distance treated as a radius. Then in Step S308, the processing device 130 configures another circle, hereinafter a fourth defined circle, with the position where the radar antenna 100 is at the second time point treated as a center and the fourth distance treated as a radius.

The first defined circle and the third defined circle have at least a first intersection point, and the second defined circle and the fourth defined circle have at least a second intersection point. Subsequently in Step S310, at least the first intersection point and at least the second intersection point are located. Depending on practical conditions, one or two intersection points may be located between each pair of defined circles, e.g. the first defined circle and the third defined circle, or the second and the fourth defined circle. In the example as shown in FIG. 3B, the first defined circle and the third defined circle intersect at two points $T_1$ and $T_3$, and the second defined circle and the fourth defined circle intersect at a point $T_2$. One of the intersection points $T_1$ and $T_3$ is supposed to be the position of the first or second retro-directive antennas, and the intersection point $T_2$ is supposed to be the position of the other retro-directive antenna. Therefore, take the intersection points $T_1$ or $T_3$ as a first hypothetical position, i.e. one antenna location, and take the intersection point $T_2$ as a second hypothetical position, i.e. the other antenna location (Step S310). Then in Step S320, a distance between the first hypothetical position and the second hypothetical position is calculated and compared with the specific distance d. If the distance is substantially equal to the specific distance d, it is determined that that the first and second hypothetical positions are the positions of the first and second retro-directive antennas 110 and 120. The direction where the vehicle will be guided can be determined accordingly (Step S330). On the contrary, if the distance is inconsistent with the specific distance d, additional procedures will be executed for locating the first and second retro-directive antennas 110 and 120.

Step S330 will be described in more detail as follows. Once the positions of the first and second retro-directive antennas 110 and 120 are determined, a first triangle can be configured with the position $P_1$ of the radar antenna 100 on the vehicle 105, the position of the first hypothetical position, e.g. $T_1$, and the position of the second hypothetical position, e.g. $T_2$, at the first time point. Likewise, a second triangle can be configured with the position $P_2$ of the radar antenna 100 on the vehicle 105, the position of the first hypothetical position, e.g. $T_1$, and the position of the second hypothetical position, e.g. $T_2$, at the second time point. Based on the angle at the vertex $P_1$ of the first triangle and the angle at the vertex $P_2$ of the second triangle, whether the vehicle 105 is approaching the middle of the points $P_1$ and $P_2$ can be determined. If the angle at the apex $P_1$ of the first triangle is greater than the angle at the apex $P_2$ of the second triangle, it is inferred that the vehicle 106 is moving away from the middle of the points $P_1$ and $P_2$. The current moving direction M of the vehicle 105 will be adjusted. In contrast, if the angle at the apex $P_1$ of the first triangle is less than the angle at the apex $P_2$ of the second triangle, it is inferred that the vehicle 106 is moving toward the middle of the points $P_1$ and $P_2$. The vehicle 105 continues to move in the direction M.

As described above, if the distance between the two hypothetical positions is inconsistent with the specific distance d, i.e. Step S320 indicates a result "NO", additional procedures will be executed for locating the first and second retro-directive antennas 110 and 120, i.e. proceed to Step S340. The first defined circle and the fourth defined circle have at least a third intersection point. The second defined circle and the third defined circle have at least a fourth intersection point. In Step S340, at least the third intersection point and at least the fourth intersection point are located and assumed to be the locations of a third hypothetical position and a fourth hypothetical position of the first and second retro-directive antennas 110 and 120. Depending on practical conditions, one or two intersection points may be located between two defined circles. According to the correlation of vertex angles of two triangles configured with the positions of the radar antenna 100 on the vehicle 105, and according to the positions of the third hypothetical position and the positions of the fourth hypothetical position respectively at two different time points, whether the current moving direction of the vehicle 105 needs to be modified can be determined (Step S350). In an alternative embodiment, whether a distance between the third and fourth hypothetical positions is consistent to the specific distance d between the first and second retro-directive antennas 110 and 120 is optionally determined first for confirming the positions of the first and second retro-directive antennas 110 and 120 before Step S350. If the result indicates "YES", Step S350 is executed, and otherwise, the process returns to Step S200 to start over. In an alternative example, the above discriminating procedure may be omitted, and Step S350 is directly executed after the third and fourth hypothetical positions are determined according to a proper algorithm. It is understood that the discriminating step for confirmation enhances reliability of the mobile navigation method.

In another embodiment, the second distance may be treated as the radius of the first defined circle, and the first distance may be treated as the radius of the second defined circle. On the other hand, the third distance and the fourth distance may still be treated as the radii of the third defined circle and the fourth defined circle, respectively. Since an OMNI antenna emits a sensing beam in a radial manner toward the surrounding, each of the defined circles represents a probable position of an object which may reflect the sensing beam, and the radius of the defined circle represents a distance between the object and the OMNI antenna. In other words, the first defined circle realized at the first time point represents a set of positions where a beam-reflecting object may be present, and the second defined circle realized at the first time point represents a set of positions where another beam-reflecting object may be present. The terms "first" and "second" used herein do not mean any sequence, but mean distinction. Likewise, the third defined circle realized at the second time point represents a set of positions where the beam-reflecting object resulting one of the first and second defined circles may be present, and the fourth defined circle realized at the second time point represents a set of positions where the beam-reflecting object resulting the other of the first and second defined circles may be present.

For example, referring to FIG. 3B, assume that the vehicle 105, as well as the radar antenna 100, is positioned at the point $P_1$ at the first time point, and moves along the direction M for a period of time. At the second time point, it arrives at the position indicated by the point $P_2$. The distances $r_{11}$ and $r_{12}$ are respective distances between the two beam-reflecting objects and the radar antenna at the point $P_1$, and the distances $r_{21}$ and $r_{22}$ are respective distances between the two beam-reflecting objects and the radar antenna at the point $P_2$. Under this circumstance, the defined circle $C_{11}$ is configured with the point $P_1$ as a center and the distance $r_{11}$ as a radius; the defined circle $C_{12}$ is configured with the point $P_1$ as a center and the distance $r_{12}$ as a radius; the defined circle $C_{21}$ is configured with the point $P_2$ as a center and the distance $r_{21}$ as a radius; and the defined circle $C_{22}$ is configured with the point P2 as a center and the distance $r_{22}$ as a radius. The defined circles $C_{11}$ and $C_{21}$ intersect at the points $T_1$ and $T_3$, the defined circles $C_{12}$ and $C_{22}$ intersect at the points $T_2$, and the defined circles $C_{11}$ and $C_{22}$ intersect at the points $F_1$ and $F_2$.

In an example, assuming that the defined circle $C_{11}$ is the first defined circle, the defined circle $C_{12}$ is the second defined circle, the defined circle $C_{21}$ is the third defined circle, and the defined circle $C_{22}$ is the fourth defined circle, then the positions of the points $T_1$ and $T_3$ are candidates of the first hypothetical position, the position of the point $T_2$ is a candidate of the second hypothetical position, and the positions of the points $F_1$ and $F_2$ are candidates of the third hypothetical position. In this example, there is no intersection between the defined circles $C_{12}$ and $C_{21}$, so the fourth hypothetical position does not exist. If the distance between one of first hypothetical positions, e.g. the point $T_1$, and the second hypothetical position, e.g. the point $T_2$, is substantially equal to the specific distance d, it can be inferred that there are retro-directive antennas respectively positioned at the points $T_1$ and $T_2$. The information can be referred to for guiding the vehicle 105.

In another example, it is assumed that the defined circle $C_{12}$ is the first defined circle, the defined circle $C_{11}$ is the second defined circle, the defined circle $C_{21}$ is the third defined circle, and the defined circle $C_{22}$ is the fourth defined circle. Since the defined circles $C_{12}$ and $C_{21}$ have no intersection, the first hypothetical point does not exist. In this case, the positions of the points $F_1$ and $F_2$ are candidates of the second hypothetical position, the position of the point $T_2$ is a candidate of the third hypothetical position, and the positions of the points $T_1$ and $T_3$ are candidates of the fourth hypothetical position. Accordingly, in Step S320 shown in FIG. 3A, the result would be "NO" as no first hypothetical position is existent, and the process proceeds to Step S340. Furthermore, it is understood from the above descriptions that a retro-directive antenna is inherently disposed at the point $T_2$, and there are two candidates, e.g. the points $T_1$ and $T_3$, of the position of another retro-directive antenna. Therefore, by comparing the distance between the points $T_1$ and $T_2$ with the specific distance d, and also comparing the distance between the points $T_3$ and $T_2$ with the specific distance d, as in Step S320, the one of the points $T_1$ and $T_3$ having a distance from the point $T_2$ substantially equal to the specific distance d would be the position of the another retro-directive antenna. Based on the obtained information, how the vehicle is guided is determined in Step S350. Step S350 may be executed in a manner similar to Step S330 or by suitably modifying Step S330.

In an example that a connecting line between the point $P_1$ and the point $P_2$ passes the point $T_2$, both the distance from the point $T_2$ to the point $T_1$ and the distance from the point $T_2$ to the point $T_3$ will be substantially equal to the specific distance d. Therefore, the compared result in Step S320 is "YES", and Step S330 will be executed. In this example, Step S330 is executed by determining the moving direction of the vehicle, i.e. from $P_1$ toward $P_2$ or from $P_2$ toward $P_1$, with the triangles at first. Then, the vehicle moves, depending on the determined moving direction, toward the point $T_1$ or the point $T_3$, and continues to move for a while. By monitoring respective energy variations of reflected waves from the points $T_1$ and $T_3$, the position of the retro-directive antenna can be determined, i.e. at the point $T_1$ or the point $T_3$. Meanwhile, according to the intensities of the retro waves received at the first time point and the second time point, whether and how the moving direction should be adjusted can be determined.

In other examples, the first, second, third and fourth defined circles may be the circles $C_{11}$, $C_{12}$, $C_{22}$ and $C_{21}$, respectively, or the circles $C_{12}$, $C_{11}$, $C_{22}$ and $C_{21}$, respectively. The locating methods of the hypothetical positions and the retro-directive antennas, as well as the determination and adjustment of the moving direction can be executed as in the above-described embodiments and examples, and will not be redundantly described herein.

Hereinafter, Step S330 will be described in more detail with reference to the flowchart of FIG. 4A. Subsequent to Step S320, a base line connecting the first hypothetical position and the second hypothetical position is located (Step S400). Meanwhile, a first angle (azimuth) between a base line and a line connecting the OMNI antenna and the first hypothetical position at a first time point is calculated (Step S412), and a second angle (azimuth) between the base line and a line connecting the OMNI antenna and the second hypothetical position at the first time point is also calculated (Step S414). Then, a third angle (azimuth) between the base line and a line connecting the OMNI antenna and the first hypothetical position at a second time point is calculated (Step S416), and a fourth angle (azimuth) between the base line and a line connecting the OMNI antenna and the second hypothetical position at the second time point is also calculated (Step S418). Subsequently in Step S420, whether the first azimuth is greater than the second azimuth is determined. If positive, whether the third azimuth is greater than the first azimuth is determined (Step S430). and if negative, whether the fourth azimuth is greater than the second azimuth is determined (Step S460). If the comparing result indicates "YES" in either Step S430 or Step S460, proceed to Step S440 to adjust the moving direction. Otherwise, proceed to Step S450, i.e. the vehicle continues to move along the current moving direction.

Figure 4A:
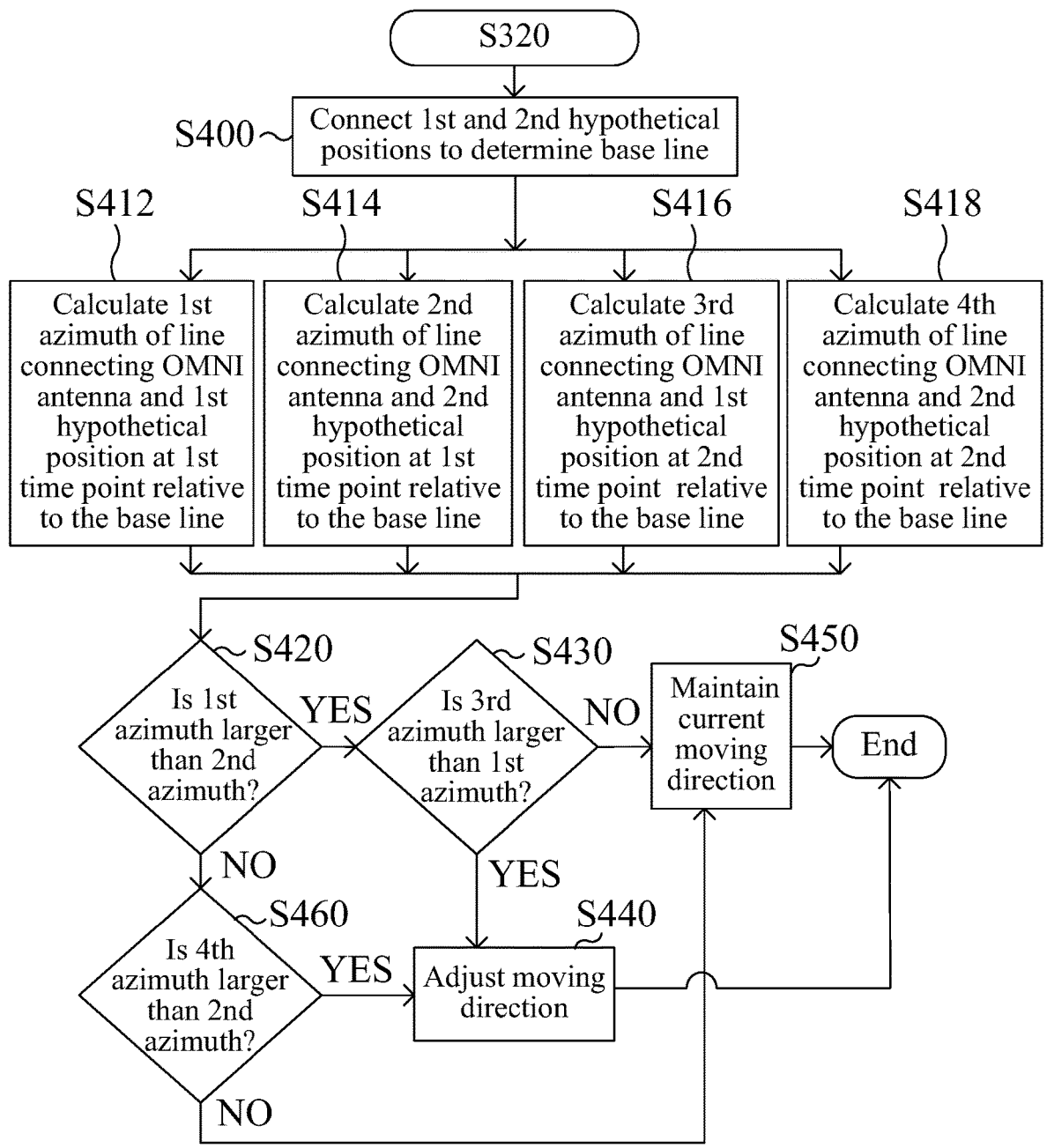
FIG. 4A is a schematic flowchart exemplifying details of the mobile navigation method as illustrated in FIG. 3A, particularly regarding Step S330.

In this embodiment, whether the moving direction should be changed is determined by executing the steps of the flowchart shown in FIG. 4A with the first, second, third and fourth azimuths. Nevertheless, the azimuths may be applied to alternative algorithms as long as the object for guiding the vehicle can be achieved.

Figure 4B:
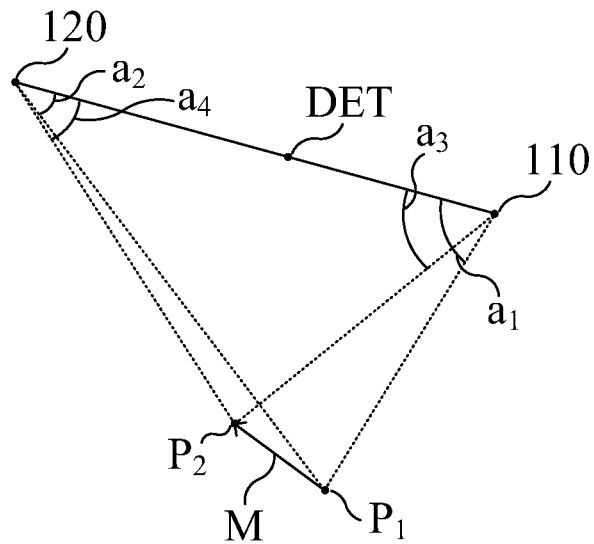
FIG. 4B is a scheme exemplifying a relationship among associated azimuths according to an embodiment of the present invention.

Hereinafter, FIG. 4B is referred to for further elaborating the mobile navigation method illustrated in the flowchart of FIG. 4A. FIG. 4B exemplifies a relationship among the associated azimuths. In this example, the mobile navigation system aims to guide the vehicle with the OMNI antenna disposed thereon to arrive at a target point DET. It is assumed that currently, the OMNI antenna is moving from the point $P_1$ to the point $P_2$ along the direction M. The first retro-directive antenna 110 and the second retro-directive antenna 120 are located in any of the previously described ways. The base line is the line segment connecting the first retro-directive antenna 110 and the second retro-directive antenna 120, and the target point DET is the midpoint of the line section between the first and second retro-directive antennas 110 and 120. The first azimuth is the azimuth $a_1$, the second azimuth is the azimuth $a_2$, the third azimuth is the azimuth $a_3$, and the fourth azimuth is the azimuth $a_4$, and in this example, the first azimuth is larger than the second azimuth, and the third azimuth is smaller than the first azimuth. Therefore, according to the mobile navigation method illustrated by the flowchart of FIG. 4A, Step S420, S430 and S450 are sequentially executed so that the moving direction is not going to be adjusted. In other words, the vehicle 105 carrying the OMNI antenna is approaching the target point DET if continuing to move along the direction M.

Figure 4C:
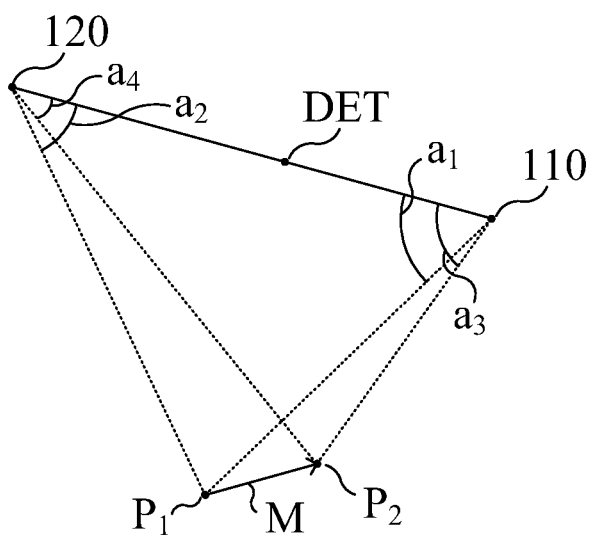
FIG. 4C is a scheme exemplifying a relationship among associated azimuths according to another embodiment of the present invention.

FIG. 4C exemplifies another relationship among the associated azimuths. In this example, the mobile navigation system also aims to guide the vehicle with the OMNI antenna disposed thereon to arrive at a target point DET. Likewise, it is assumed that currently, the OMNI antenna is moving from the point $P_1$ to the point $P_2$ along the direction M. The first retro-directive antenna 110 and the second retro-directive antenna 120 are located in any of the previously described ways. The base line is the section line connecting the first retro-directive antenna 110 and the second retro-directive antenna 120, and the target point DET is the midpoint of the line section between the first and second retro-directive antennas 110 and 120. The first azimuth is the azimuth $a_1$, the second azimuth is the azimuth $a_2$, the third azimuth is the azimuth $a_3$, and the fourth azimuth is the azimuth $a_4$. In this example, the first azimuth is larger than the second azimuth, and the third azimuth is larger than the first azimuth. Therefore, according to the mobile navigation method illustrated by the flowchart of FIG. 4A, Step S420, S430 and S440 are sequentially executed so that the moving direction is going to be adjusted.

Once the moving direction of a vehicle is determined to be adjusted according to the present invention, there may be a variety of ways to adjust the moving direction, depending on practical requirements. For example, it is preferred to dynamically adjust the moving direction to have the vehicle gradually approach the target position. Concretely, with the dynamic adjustment of the moving direction, the first azimuth $a_1$ would be decreasing.

It is to be noted that the target position DET need not be the midpoint of the section line between the first and second retro-directive antennas 110 and 120. Actually, as long as the target position has a constant or derivable correlation to the position of the first retro-directive antenna 110 and the second retro-directive antenna 120, the mobile navigation system 10 according to the present invention can work with a suitable navigation application to guide the vehicle 105 to the target position DET based on a previously inputted correlation of positions.

Although the above embodiments and examples are described with an OMNI antenna serving as the radar antenna of the present invention, it is understood that the radar antenna may alternatively be a directive beamforming antenna, and the corresponding navigation method implemented with the directive beamforming antenna can be realized by modifying the above-described embodiments and examples without departing from the spirit of the present invention.

Figure 5:
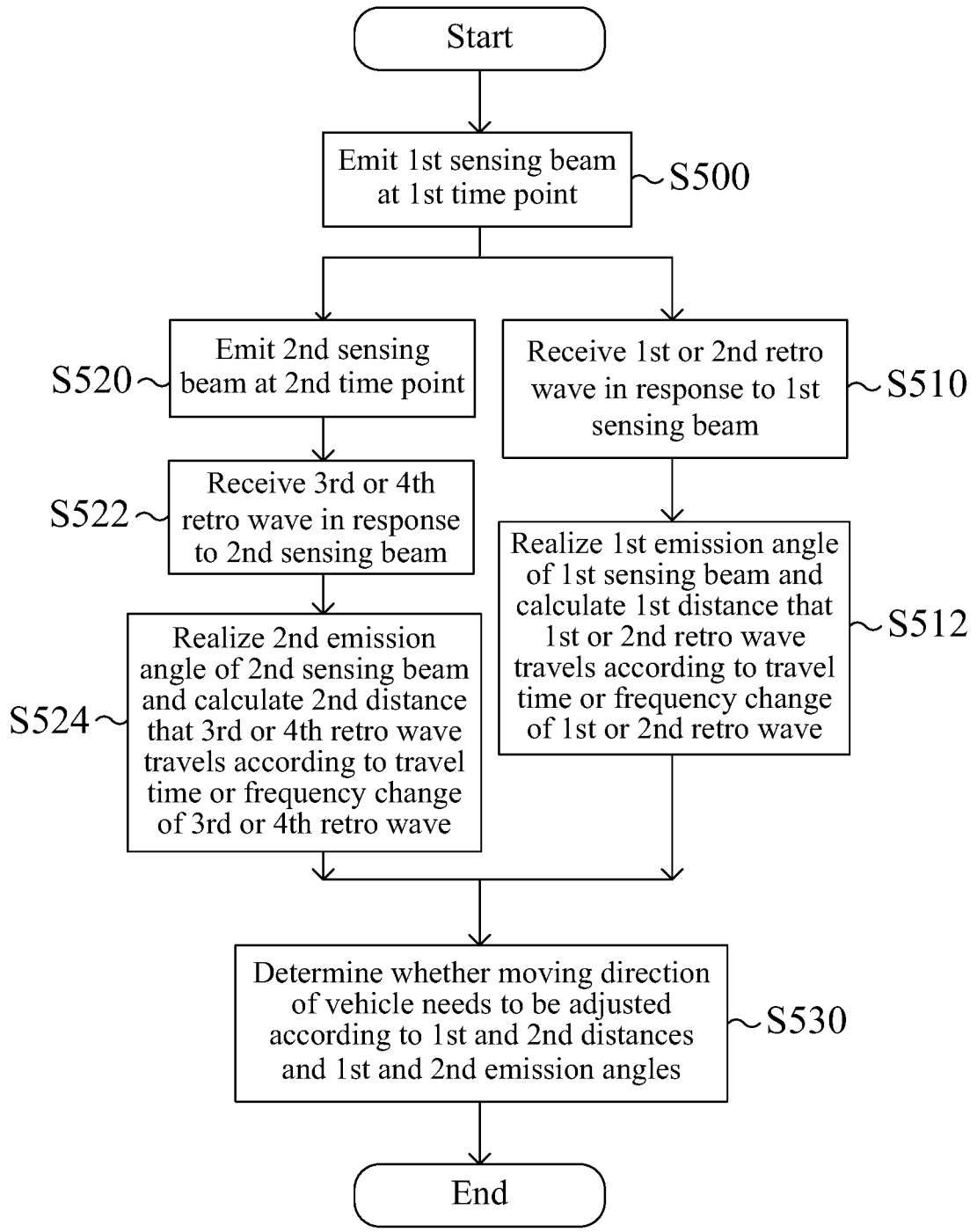
FIG. 5 is a schematic flowchart illustrating a mobile navigation method according to another embodiment of the present invention.

FIG. 5 is a flowchart embodying a mobile navigation method executed by the mobile navigation system 10 illustrated in FIG. 1, in which a directive beamforming antenna is used as the radar antenna 100 and carried by the vehicle 105. In this embodiment, a first sensing beam is emitted at a first time point by the directive beamforming antenna 100 to detect whether a retro-directive antenna, e.g. the first retro-directive antenna 110 or the second retro-directive antenna 120, is present in a specified area (Step S500). If a first retro wave is returned in response to the first sensing beam by the first retro-directive antenna 110 or a second retro wave is returned in response to the first sensing beam by the second retro-directive antenna 120, and the first or second retro wave is received by the directive beamforming antenna 100 (Step S510), it can be determined that a retro-directive antenna is present in the sensing area of the sensing beam. Since every sensing beam emitted by the directive beamforming antenna 100 has a specific emission angle, a first emission angle of the first sensing beam can be realized when receiving the first or second retro wave. Furthermore, a first distance that the first retro wave travels can be calculated according to the travel time of the first retro wave, for example, when a pulse radar is used (Step S512). Alternatively, the first distance that the first retro wave travels can be calculated according to the frequency difference of the first retro wave from the sensing beam, for example, when a frequency modulated continuous waveform (FMCW) radar is used. The directive beamforming antenna 100 used in the present invention may be an antenna whose emission angle can be shifted, or an antenna whose emission angle is fixed.

After the first sensing beam is emitted at the first time point by the directive beamforming antenna 100, a second sensing beam is emitted at a second time point by the directive beamforming antenna 100 (Step S520). Likewise, whether a retro-directive antenna, e.g. the first retro-directive antenna 110 or the second retro-directive antenna 120, is present in a specified area is determined (Step S520). If a third retro wave is returned in response to the second sensing beam by the first retro-directive antenna 110 or a fourth retro wave is returned in response to the second sensing beam by the second retro-directive antenna 120, and the third or fourth retro wave is received by the directive beamforming antenna 100 (Step S522), it can be determined that a retro-directive antenna, other than the retro-directive antenna generating the first retro wave, is present in the sensing area of the second sensing beam. A second emission angle of the second sensing beam is realized when receiving the third or fourth retro wave, and then a second distance that the second retro wave travels can be calculated according to the travel time of the second retro wave (Step S524).

Subsequently, proceed to Step S530. According to several parameters, for example, including the first distance, the second distance, the first emission angle and the second emission angle, whether and how the moving direction of the vehicle 105 should be adjusted can be determined.

Figure 6:
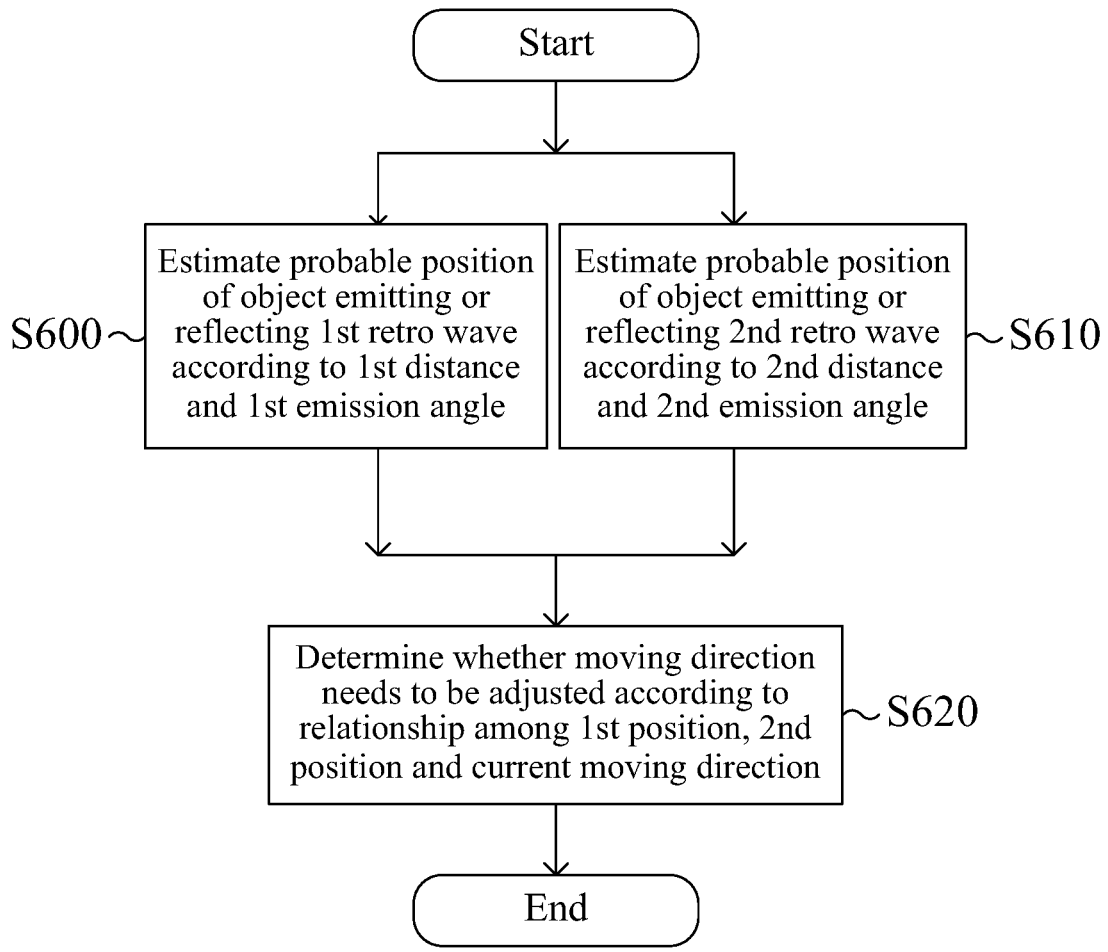
FIG. 6 is a schematic flowchart exemplifying details of the mobile navigation method as illustrated in FIG. 5, particularly regarding Step S530.

Further referring to FIG. 6, which exemplifies details of the mobile navigation method as illustrated in FIG. 5, particularly regarding Step S530. After Step S512 and S524, the aforementioned parameters are obtained. Then, a probable position of an object which may emit or reflect the first or second retro wave can be calculated according to the first distance and the first emission angle (Step S600), and is referred to as a first position. Likewise, a probable position of an object which may emit or reflect the third or fourth retro wave can be calculated according to the second distance and the second emission angle (Step S610), and is referred to as a second position. Subsequently, in Step S620, whether the moving direction needs to be adjusted is determined according to a relationship among the first position, the second position and the current moving direction, e.g. the direction M. A variety of algorithms may be adopted for adjusting the moving direction, if necessary. The object of the present invention can be achieved no matter which algorithm is adopted. For example, when the vehicle 105 moving in the current direction, e.g. the direction M, is actually being away from both the first position and the second position, the moving direction should be adjusted to have the vehicle move toward one of the first and second positions, which is farther. The movement of the vehicle toward the first or second position may be achieved by gradually approaching, or by turning to somewhere between the first and second positions.

Compared with the embodiments described above with reference to FIGS. 3A-3B and FIGS. 4A-4C, the mobile navigation method as illustrated in FIG. 6 would be simpler in arithmetical operation. Since every sensing beam emitted by the directive beamforming antenna 100 has a specific emission angle, so the orientation of the object, which reflects the sensing beam into a corresponding retro wave, relative to the directive beamforming antenna, which receives the corresponding retro wave, can be directly derived from the emission angle of the sensing beam. Furthermore, according to the time difference from the emission of the sensing beam to the receiving of the retro wave, the distance between the directive beamforming antenna and the beam-reflecting object can be directly obtained. In other words, the azimuth and distance information required for guiding the vehicle can be readily obtained, and no complicated operation is involved.

In a case that the mobile navigation is conducted in an area where multi-path reflection is not an issue, e.g. an open space, two specific beam-reflecting objects can be used in lieu of the retro-directive antennas to accomplish the guidance of the vehicle. The omission of the retro-directive antennas facilitates reduction of the cost of the navigation system.

To sum up, by disposing a radar antenna on a vehicle and arranging two retro-directive antennas or specific beam-reflecting objects around the target point, the target area can be dynamically located to adaptively adjust the moving direction of the vehicle. Furthermore, by monitoring the travel speed and travel time of the radar wave, the moving speed of the vehicle and the orientation and distance of the target area relative to the radar antenna can be calculated so as to estimate the arrival time.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures. For example, in spite hardware devices are exemplified as above in order to practice the redundancy power supply system and the power control circuit according to the present invention, hardware/software hybrid modules or firmware designs may also adopted as alternatives of the devices when appropriate.

What is claimed is:

1. A mobile navigation system for guiding a vehicle toward a target point, comprising:
 a radar antenna carried by the vehicle, emitting a first sensing beam at a first time point and emitting a second sensing beam at a second time point;
 a first retro-directive antenna disposed at a first position;
 a second retro-directive antenna disposed at a second position, which is at a side of the target point opposite to the first position, and has a specific distance from the first position; and
 a processing device electrically coupled to the radar antenna,
 wherein the first retro-directive antenna and the second retro-directive antenna respectively receive the first sensing beam and return a first retro wave and a second retro wave corresponding to a direction of the first sensing beam,
 wherein the first retro-directive antenna and the second retro-directive antenna respectively receive the second sensing beam and return a third retro wave and a fourth retro wave corresponding to a direction of the second sensing beam, and
 wherein the processing device receives the first, second, third and fourth retro waves, calculates a first distance that the first retro wave travels, a second distance that the second retro wave travels, a third distance that the third retro wave travels, a fourth distance that the fourth retro wave travels, determines a first hypothetical position of the first retro-directive antenna and a second hypothetical position of the second retro-directive antenna according to a position of the radar antenna and the first, second, third and fourth distances, and determines whether a moving direction of the vehicle needs to be adjusted or not by comparing a distance between the first hypothetical position and the second hypothetical position with the specific distance.

2. The system according to claim 1, wherein the radar antenna is an omnidirectional antenna.

3. The system according to claim 1, wherein the radar antenna is a directive beamforming antenna.

4. A mobile navigation method for guiding a moving vehicle toward a target point, wherein the moving vehicle carries an omnidirectional antenna, and a first retro-directive antenna and a second retro-directive antenna are arranged at opposite sides of the target point and have a specific distance from each other, the mobile navigation method comprising:
 emitting a first sensing beam from the moving vehicle at a first time point;
 calculating a first distance that a first retro wave travels and a second distance that a second retro wave travels, wherein the first retro wave and the second retro wave are transmitted back corresponding to the first sensing beam;
 emitting a second sensing beam from the moving vehicle at a second time point, which is a period of time after the first time point;
 calculating a third distance that a third retro wave travels and a fourth distance that a fourth retro wave travels, wherein the third retro wave and the fourth retro wave are transmitted back corresponding to the second sensing beam; and
 determining whether a current moving direction of the moving vehicle needs to be adjusted or not according to the first, second, third and/or fourth distances and the specific distance,
 wherein the step of determining whether the current moving direction of the moving vehicle needs to be adjusted or not includes:
 defining a first circle with a position of the omnidirectional antenna at the first time point as a center of the first defined circle and the first distance as a radius of the first defined circle;
 defining a second circle with a position of the omnidirectional antenna at the first time point as a center of the second defined circle and the second distance as a radius of the second defined circle;

defining a third circle with a position of the omnidirectional antenna at the second time point as a center of the third defined circle and the third distance as a radius of the third defined circle;

defining a fourth circle with a position of the omnidirectional antenna at the second time point as a center of the fourth defined circle and the fourth distance as a radius of the fourth defined circle;

using an intersection point of the first defined circle and the third defined circle as a first hypothetical position, using an intersection point of the second defined circle and the fourth defined circle as a second hypothetical position, and determining whether a distance between the first hypothetical position and the second hypothetical position is equal to the specific distance or not;

if the distance between the first hypothetical position and the second hypothetical position is substantially equal to the specific distance, determining whether the current moving direction of the moving vehicle needs to be adjusted or not according to the first hypothetical position and the second hypothetical position; and if the distance between the first hypothetical position and the second hypothetical position is not equal to the specific distance, determining whether the current moving direction of the moving vehicle needs to be adjusted or not according to a third hypothetical position and a fourth hypothetical position, wherein an intersection point of the first defined circle and the fourth defined circle is used as the third hypothetical position, and an intersection point of the second defined circle and the third defined circle is used as the fourth hypothetical position.

5. The method according to claim 4, wherein whether the current moving direction of the moving vehicle needs to be adjusted or not is determined according to the first, second, third and/or fourth distances, the specific distance, and intensities of the first, second, third and/or fourth retro waves.

6. The method according to claim 4, wherein the step of determining whether the current moving direction of the moving vehicle needs to be adjusted or not includes:

connecting the first hypothetical position and the second hypothetical position as a base line, wherein a first azimuth exists between the base line and a line connecting the omnidirectional antenna and the first hypothetical position at the first time point, a second azimuth exists between the base line and a line connecting the omnidirectional antenna and the second hypothetical position at the first time point, a third azimuth exists between the base line and a line connecting the omnidirectional antenna and the first hypothetical position at the second time point, and a fourth azimuth exists between the base line and a line connecting the omnidirectional antenna and the second hypothetical position at the second time point; and comparing the first, second, third and/or fourth azimuths to determine whether the current moving direction of the moving vehicle needs to be adjusted or not.

7. The method according to claim 6, wherein the step of determining whether the current moving direction of the moving vehicle needs to be adjusted or not includes:

comparing the first azimuth and the second azimuth;

comparing the third azimuth and the first azimuth if the first azimuth is not smaller than the second azimuth; and determining that the current moving direction of the moving vehicle needs to be adjusted if the third azimuth is larger than the first azimuth.

8. The method according to claim 7, further comprising a step of adjusting the current moving direction of the moving vehicle to have the first azimuth gradually decrease if it is determined that the current moving direction of the moving vehicle needs to be adjusted.

9. The method according to claim 6, wherein the step of determining whether the current moving direction of the moving vehicle needs to be adjusted or not includes:

comparing the first azimuth and the second azimuth;

comparing the fourth azimuth and the second azimuth if the first azimuth is not larger than the second azimuth; and determining that the current moving direction of the moving vehicle needs to be adjusted if the fourth azimuth is larger than the second azimuth.

* * * * *